United States Patent
Youn et al.

(10) Patent No.: US 8,320,336 B2
(45) Date of Patent: Nov. 27, 2012

(54) METHOD FOR TRANSMITTING AND RECEIVING CONTROL CHANNEL WITH ADDITIONAL INFORMATION

(75) Inventors: Ae Ran Youn, Gyeonggi-do (KR); Bin Chul Ihm, Gyeonggi-do (KR); Yong Ho Kim, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 353 days.

(21) Appl. No.: 12/601,228

(22) PCT Filed: Apr. 30, 2008

(86) PCT No.: PCT/KR2008/002455
§ 371 (c)(1),
(2), (4) Date: Apr. 2, 2010

(87) PCT Pub. No.: WO2008/143410
PCT Pub. Date: Nov. 27, 2008

(65) Prior Publication Data
US 2010/0189054 A1     Jul. 29, 2010

(30) Foreign Application Priority Data
May 22, 2007  (KR) .......................... 10-2007-0049840

(51) Int. Cl.
*H04B 7/216*     (2006.01)
(52) U.S. Cl. ..................... 370/335; 455/403; 455/422.1; 455/450
(58) Field of Classification Search .......... 370/310–350; 455/422.1, 450–454
See application file for complete search history.

(56) References Cited

U.S. PATENT DOCUMENTS

| | | | |
|---|---|---|---|
| 6,831,909 B1 | 12/2004 | Koo et al. | |
| 6,934,275 B1 | 8/2005 | Love et al. | |
| 2007/0274253 A1* | 11/2007 | Zhang et al. | 370/328 |
| 2010/0103886 A1* | 4/2010 | Chun et al. | 370/329 |

FOREIGN PATENT DOCUMENTS

KR     10-2004-0064938     7/2004

* cited by examiner

*Primary Examiner* — Charles C Jiang
(74) *Attorney, Agent, or Firm* — Lee, Hong, Degerman, Kang & Waimey

(57) ABSTRACT

A method for transmitting and receiving a control channel with additional information is disclosed. To this end, a mobile station acquires information of at least one control channel, which supports additional information transmission through phase rotation, and phase rotation value information for representing the additional information, and transmits control information through any one of the control channels and the additional information through phase rotation of the control information. A base station provides information of at least one control channel, which supports additional information transmission through phase rotation, and phase rotation value information for representing the additional information, and simultaneously receives specific control information and additional information from the mobile station based on the control channel information and the phase rotation value information.

4 Claims, 7 Drawing Sheets

METHOD FOR TRANSMITTING AND RECEIVING CONTROL CHANNEL WITH ADDITIONAL INFORMATION

CROSS-REFERENCE TO RELATED APPLICATIONS

This application is the National Stage filing under 35 U.S.C. 371 of International Application No. PCT/KR2008/002455, filed on Apr. 30, 2008, which claims the benefit of earlier filing date and right of priority to Korean Application No. 10-2007-0049840, filed on May 22, 2007.

TECHNICAL FIELD

The present invention relates to a method for transmitting and receiving a control channel with additional information.

BACKGROUND ART

In a broadband wireless access system according to the related art, a channel quality indicator (hereinafter, referred to as "CQI") is transmitted through a fast feedback channel, a bandwidth (BW) request signal is transmitted through a ranging channel, and acknowledgement/negative acknowledgement (hereinafter, referred to as "ACK/NACK") signals are transmitted through ACK/NACK channels.

In the aforementioned broadband wireless access system according to the related art, in which the CQI and the bandwidth request signal are respectively transmitted through separate channels, if a mobile station (MS) requests a base station (BS) to provide uplink resources, since the ranging channel is contention-based and a plurality of mobile stations can simultaneously use the same code, it is difficult to success the bandwidth request only one time. Also, for request of uplink resources, CDMA code of 144 bits should be transmitted to the base station, and at least two slots (or six slots: in case of transmission of three CDMA codes) should be used. Accordingly, if transmission is performed several times as the bandwidth request fails to be successfully performed only one time, a problem occurs in that a waste of the power and frequency resources may be caused in the mobile station.

Meanwhile, in order to solve the aforementioned problem, a method for transmitting specific BW request information to a corresponding position without transmitting channel status information to a CQI channel (hereinafter, referred to as "CQICH") has been suggested. However, this method still has a problem in that channel status information is not transmitted during bandwidth request.

Furthermore, if CQI information and ACK/NACK information are respectively transmitted through separate channels in the same manner as a mobile communication system according to the related art, since ACK/NACK information of the mobile station is prior to CQI information, the mobile station should transmit ACK/NACK information only to the base station, or should additionally allocate corresponding CQICH to transmit CQI information and ACK/NACK information. Also, if an ACKCH region is allocated to a region such as a fast feedback channel, a problem occurs in that a waste of radio resources is caused as a fast feedback channel should newly be allocated.

If each of control information is transmitted through a separate control channel as above, a waste of the transmission power and radio resources may be caused in the mobile station. In this respect, a technique of transmitting additional control information to a control channel is required.

DETAILED DESCRIPTION OF THE INVENTION

Technical Problems

Accordingly, the present invention is directed to a method for transmitting and receiving a control channel with additional information, which substantially obviates one or more problems due to limitations and disadvantages of the related art.

An object of the present invention is to provide a method for transmitting and receiving a control channel with additional information, in which additional information is transmitted to and received from a specific control channel by using phase rotation of corresponding control information without affecting existing information.

Furthermore, a procedure between a base station and a mobile station and transmitting and receiving parameters between them are defined in accordance with each of control information.

Technical Solutions

To achieve the object and other advantages and in accordance with the purpose of the invention, as embodied and broadly described herein, a method for transmitting a control channel comprises acquiring information of at least one control channel, which supports additional information transmission through phase rotation, and phase rotation value information for representing the additional information, and transmitting control information through any one of the control channels and the additional information through phase rotation of the control information.

The information of at least one control channel and the phase rotation value information representing the additional information are acquired through an uplink channel descriptor (UCD). Alternatively, the information of at least one control channel may be acquired through a subscriber station basic capability (SBC) negotiation message, and the phase rotation value information for representing the additional information may be pre-defined between a transmission side and a receiving side.

Furthermore, the at least one control channel includes a channel quality indicator channel (CQICH) and an acknowledgement/negative acknowledgement (ACK/NACK) channel. If the at least one control channel which transmits the additional information is the channel quality indicator channel, the additional information is at least one of bandwidth request information and ACK/NACK information. In more detail, if the additional information is the bandwidth request information, the phase rotation value information for representing the additional information may correspond to the bandwidth request information. In this case, the method further comprises receiving a bandwidth allocation information element (IE) from a base station, the bandwidth allocation information element including channel quality indicator channel identifier (CQICH_ID), transmitting a bandwidth request header using the channel quality indicator channel identifier, and being allocated with a bandwidth in accordance with the bandwidth request header.

Furthermore, if the at least one control channel is a channel quality indicator channel (CQICH) and the additional information is the ACK/NACK information, the phase rotation value information for representing the additional information includes the first phase rotation value information for representing the ACK and the second phase rotation value information for representing the NACK.

Meanwhile, a method for receiving a control channel comprises providing information of at least one control channel, which supports additional information transmission through phase rotation, and phase rotation value information for representing the additional information, and receiving control information through any one of the control channels and the additional information through phase rotation of the control information.

Advantageous Effects

According to the aforementioned aspects of the present invention, since additional information can be transmitted to a specific control channel using phase rotation information in addition to corresponding control information, a waste of the transmission power and uplink resources in the mobile station can be avoided.

BEST MODE FOR CARRYING OUT THE INVENTION

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment with which the present invention can be carried out. Hereinafter, the detailed description includes detailed matters to provide full understanding of the present invention. However, it will be apparent to those skilled in the art that the present invention can be carried out without the detailed matters.

Meanwhile, in some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

As described above, the present invention is intended to provide a method for transmitting and receiving additional information to and from a specific control channel without affecting existing information by using phase rotation of corresponding control information. To this end, control channels for transmitting and receiving each of control information will be described in more detail. Then, a detailed method for transmitting and receiving other control information to any one of the control channels in the form of additional information will be described.

First of all, a fast feedback channel used for transmission of CQI information will be described.

Figure 1:
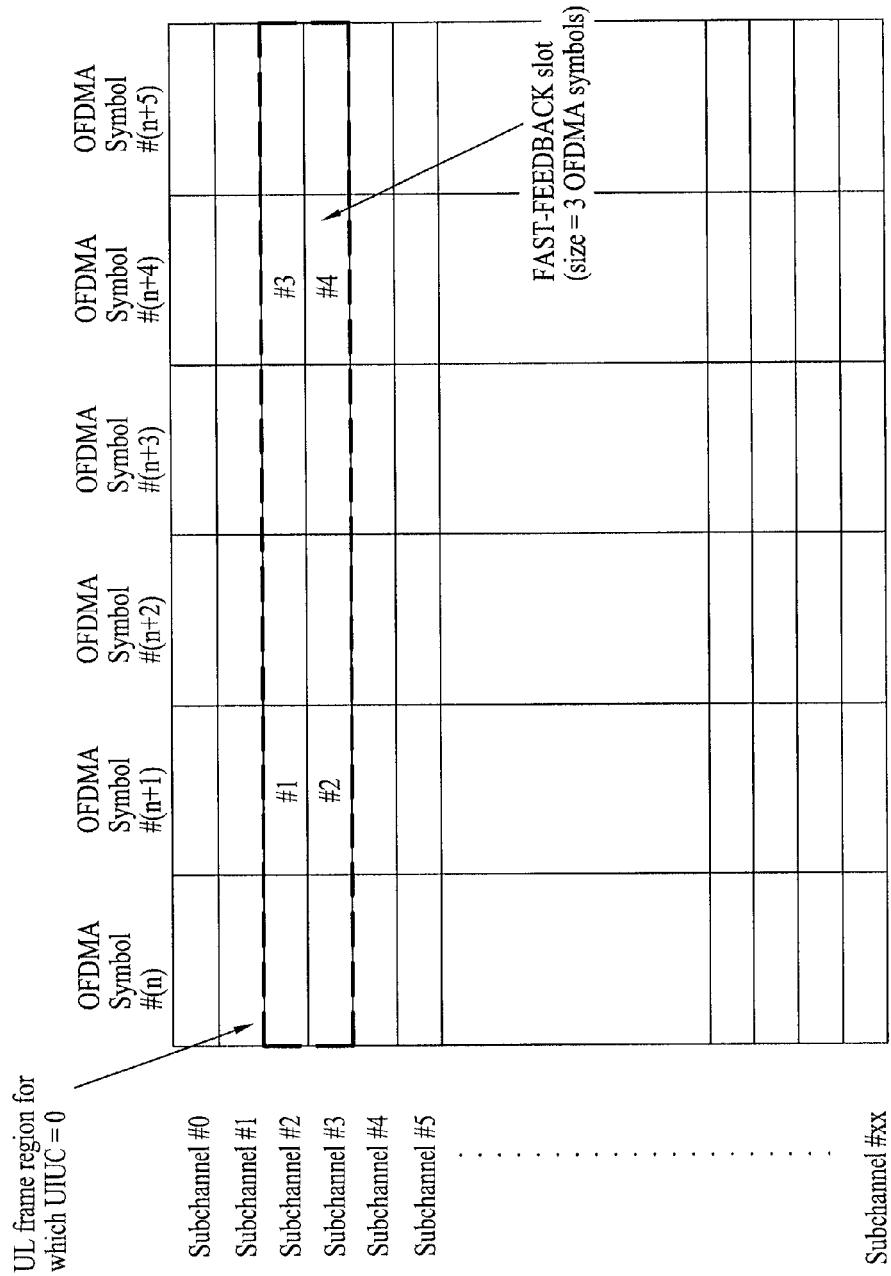
FIG. 1 is a diagram illustrating a procedure of mapping a fast feedback message with a fast feedback region.

FIG. 1 is a diagram illustrating a procedure of mapping a fast feedback message with a fast feedback region.

As illustrated in FIG. 1, some region of an uplink subframe is used as a fast feedback region. A procedure of allocating channels is as shown in FIG. 1, and one subchannel (i.e., 48 data subcarriers) is used to express one CQI (6 bits). The subchannel includes six tiles, which are distributed in the whole region.

In more detail, CQI information can be transmitted by being mapped with any one of four slots within a region marked by a dotted line of FIG. 1.

Meanwhile, if CQI information is mapped with subcarriers of the fast feedback channel, it can be modulated using vector indexes as follows.

TABLE 1

| Vector index | Data subcarrier modulation per Code word Subcarrier(0), Subcarrier(1), ... Subcarrier(7) |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

$$P0 = \exp\left(f \cdot \frac{\pi}{4}\right)$$

$$P1 = \exp\left(f \cdot \frac{3\pi}{4}\right)$$

$$P2 = \exp\left(-f \cdot \frac{3\pi}{4}\right)$$

$$P3 = \exp\left(-f \cdot \frac{\pi}{4}\right)$$

Furthermore, for subchannelization, in a partial usage of subchannel (PUSC; 48 data subcarriers+24 pilot subcarriers) or an optional PUSC (OPUSC; 48 data subcarriers+6 pilot subcarriers), mapping is performed for the vector indexes of Table 1 per tile as illustrated in Table 2 below so that mapping can be performed for CQI information of 6 bits.

TABLE 2

| 6-bit Payload (binary) | Fast-feedback vector indices per Tile Tile(0), Tile(1), ... Tile(5) |
| --- | --- |
| 000000 | 0, 0, 0, 0, 0, 0 |
| 000001 | 1, 1, 1, 1, 1, 1 |
| 000010 | 2, 2, 2, 2, 2, 2 |
| 000011 | 3, 3, 3, 3, 3, 3 |
| 000100 | 4, 4, 4, 4, 4, 4 |
| 100000 | 6, 7, 5, 1, 2, 4 |
| 100001 | 7, 6, 4, 0, 3, 5 |
| 100010 | 4, 5, 7, 3, 0, 6 |
| 100011 | 5, 4, 6, 2, 1, 7 |
| 100100 | 2, 3, 1, 5, 6, 0 |

Next, a ranging channel used for transmission of bandwidth request (BR) information and a bandwidth request procedure using the same will be described.

The ranging channel is basically contention-based as described above. In other words, if several users transmit any one of CDMA codes respectively selected from themselves to an allocated region, several codes are transmitted to the region. The base station decodes the region, and, if there is a code that can be read out in the decoded region, performs ranging or BW request procedure of the user who has transmitted the code that can be read out. A code generated by a pseudo random bit sequence (PRBS) generator, which will be described later, can be used as the CDMA code for the ranging procedure.

Figure 2:
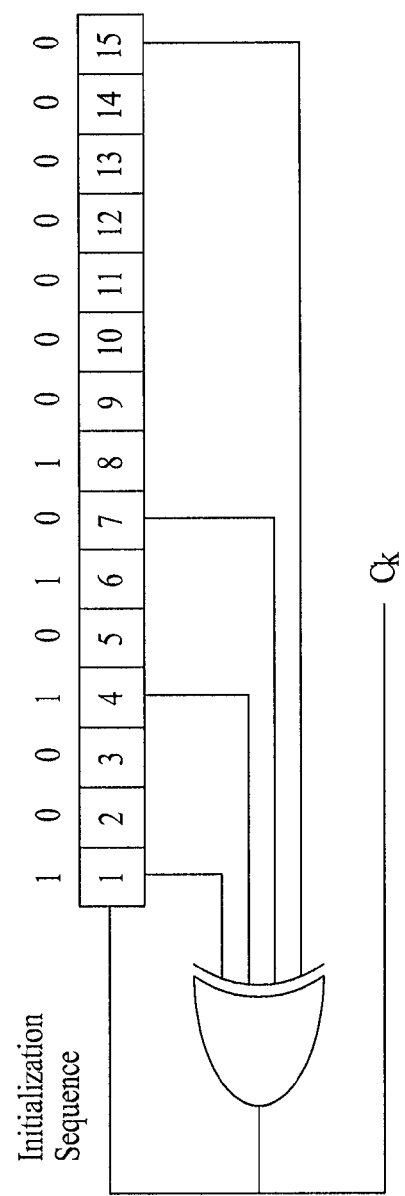
FIG. 2 is a diagram illustrating an operation of a pseudo random bit sequence (PRBS) generator for generating a ranging code.

FIG. 2 is a diagram illustrating an operation of the PRBS generator for generating a ranging code.

The PRBS generator is initiated by seed sequences {0, 0, 0, 0, 0, 0, 0, 1, 0, 1, 0, 1, 0, 0, 1} as illustrated in FIG. 2, and generates a long sequence $C_k$ as an output sequence. Therefore, in the ranging procedure, this output sequence is cut so as to generate a total of 288 codes of 144 bits. Some of the generated 288 codes can be used for the bandwidth request as described above.

The procedure of performing the existing bandwidth request using the aforementioned ranging code will be described below.

Figure 3:
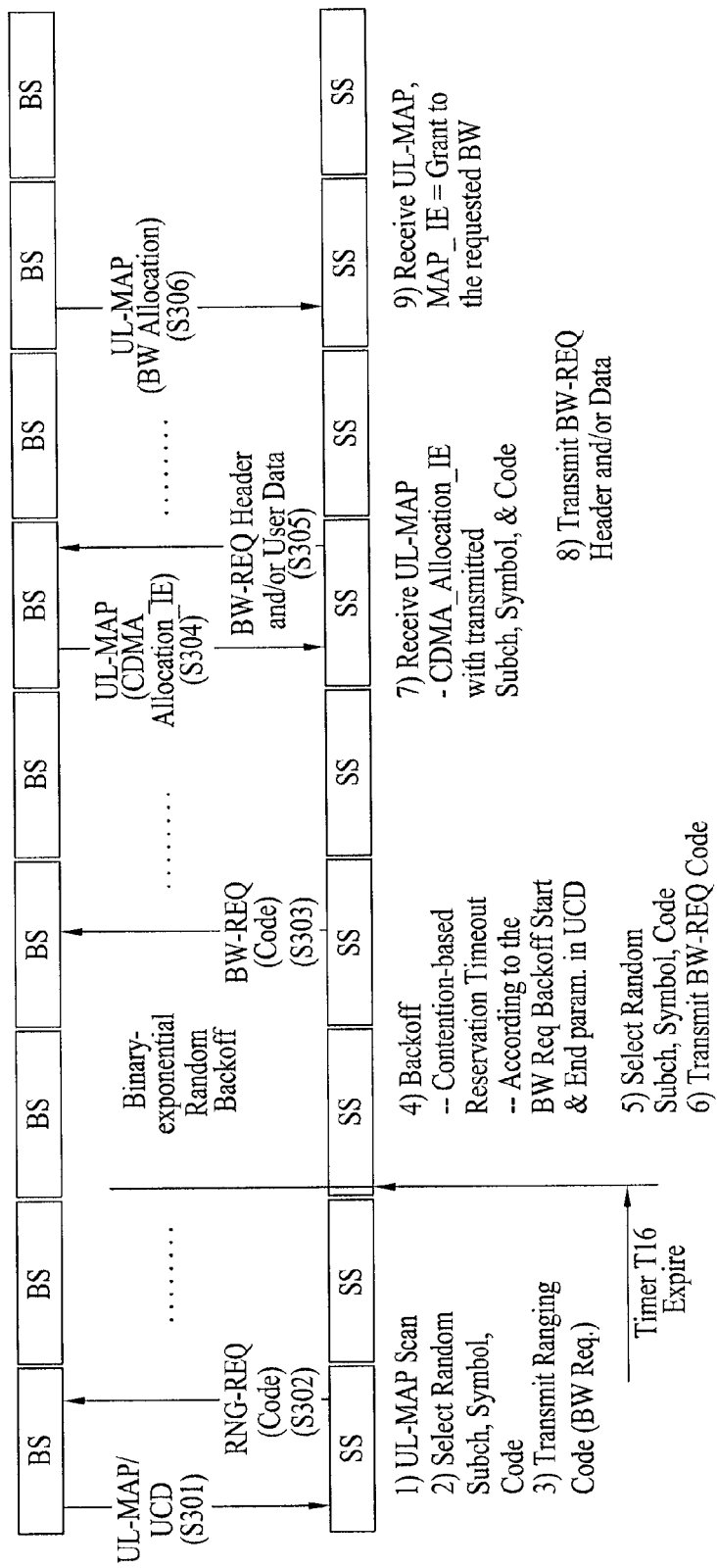
FIG. 3 is a diagram illustrating a procedure of requesting a bandwidth using a ranging channel.

FIG. 3 is a diagram illustrating the procedure of requesting a bandwidth using a ranging channel.

In FIG. 3, message exchange between the mobile station (or subscriber station (SS)) and the base station (BS) is designated by each step, and steps performed in the mobile station in accordance with each step are sequentially marked at a lower part.

First of all, in step S301, the base station transmits UL-MAP/UCD message to the mobile station. Then, the mobile station scans the UL-MAP, and selects a random subchannel, symbol, code, etc. Afterwards, the mobile station transmits a ranging code through RNG-REQ message in step S302, wherein the ranging code represents bandwidth request.

At this time, since the bandwidth request through the ranging channel is contention-based as described above, the base station may not respond to the RNG-REQ message transmitted in step S302. For this reason, backoff may occur after a predetermined time (T16) passes. In this case, the mobile station repeats the aforementioned steps to perform the bandwidth request through BW-REQ message in step S303.

The base station which has received the BW-REQ message transmits a CDMA allocation information element (CDMA_Allocation_IE) through the UL-MAP in step S304, and the mobile station which has received the CDMA allocation information element (CDMA_Allocation_IE) can transmit a bandwidth request header and/or user data in step S305. Afterwards, the base station can allocate the bandwidth requested through the UP-MAP in step S306.

Since the bandwidth request using the ranging channel is contention-based as described above, there may occur a case where bandwidth request information is retransmitted as illustrated in FIG. 3. For this reason, a waste of the transmission power and uplink resources may be caused in the mobile station.

Meanwhile, a method of allocating an ACK signal region of HARQ burst in an orthogonal frequency division multiple access (OFDMA) system will be described below.

Figure 4:
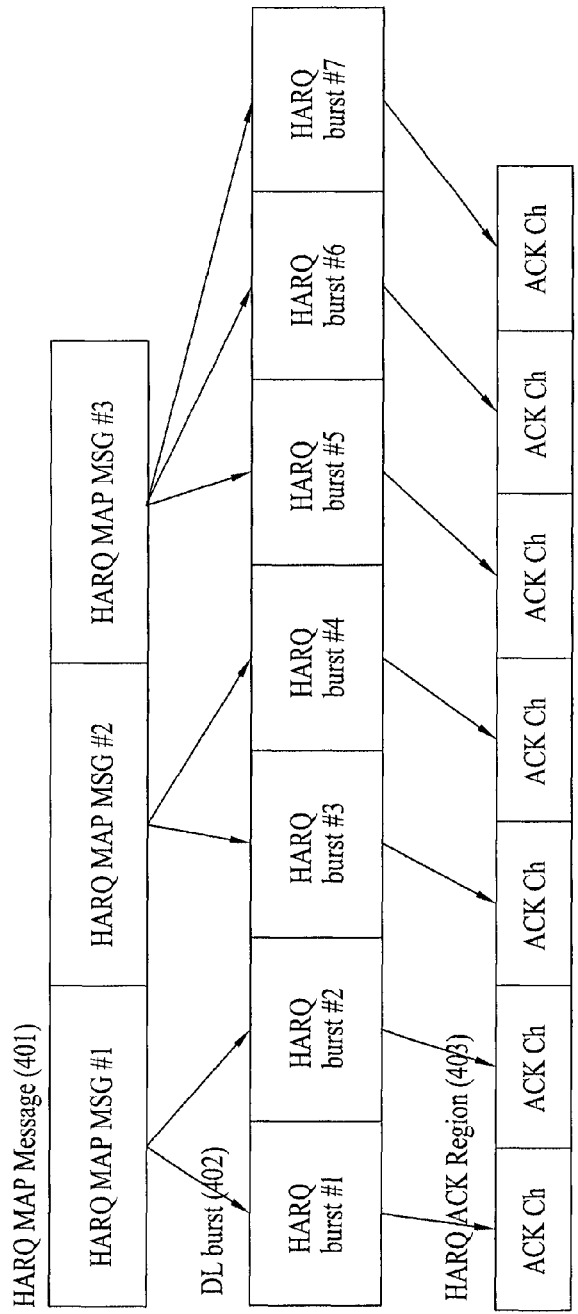
FIG. 4 is a diagram illustrating a method of allocating a Hybrid Automatic Repeat reQuest (HARQ) acknowledgement channel ("ACKCH") in a HARQ ACKCH region.

FIG. 4 is a diagram illustrating a method of allocating a HARQ acknowledgement channel ("ACKCH") in a HARQ ACKCH region.

In order to support HARQ in the OFDMA system, HARQ MAP messages 401 illustrated in FIG. 4 can be used. The DL MAP includes HARQ and sub-MAP pointer. If the mobile station reports a position of HARQ MAP using the HARQ pointer, the HARQ MAP messages 401 can be used in such a manner that they sequentially allocate downlink bursts 402 to a subchannel axis of a downlink. At this time, a start point of the burst is a position where a previous burst ends, and the burst occupies radio resources as much as a length allocated from the start point. This can equally be applied to an uplink. Also, the mobile station can report to the ACKCH region 403 of the uplink through the ACK/NACK signal as to whether the transmitted data burst has been successfully received.

In more detail, if the mobile station has received HARQ related nth burst from the ith frame, it can transmit the ACK/NACK signal to the nth half-subchannel of the ACKCH region of the uplink belonging to the (i+j)th frame. At this time, frame offset j is defined in a HARQ ACK Delay field for DL Burst of the UCD message.

Meanwhile, the ACK/NACK information transmitted as aforementioned is generally prior to CQI information. Accordingly, if the ACK/NACK information is transmitted separately from the CQI information as described above, the mobile station should transmit the ACK/NACK information only to the base station or should allocate a corresponding CQICH to transmit the CQI information and the ACK/NACK information. In this case, a problem may occur in that a waste of radio resources is caused.

Therefore, one embodiment of the present invention suggests a method for transmitting and receiving additional information using phase rotation of corresponding control information to and from any one of the control channels such as the fast feedback channel, the ACKCH, and the ranging channel, together with the corresponding control information. The method will now be described in detail.

Figure 5:
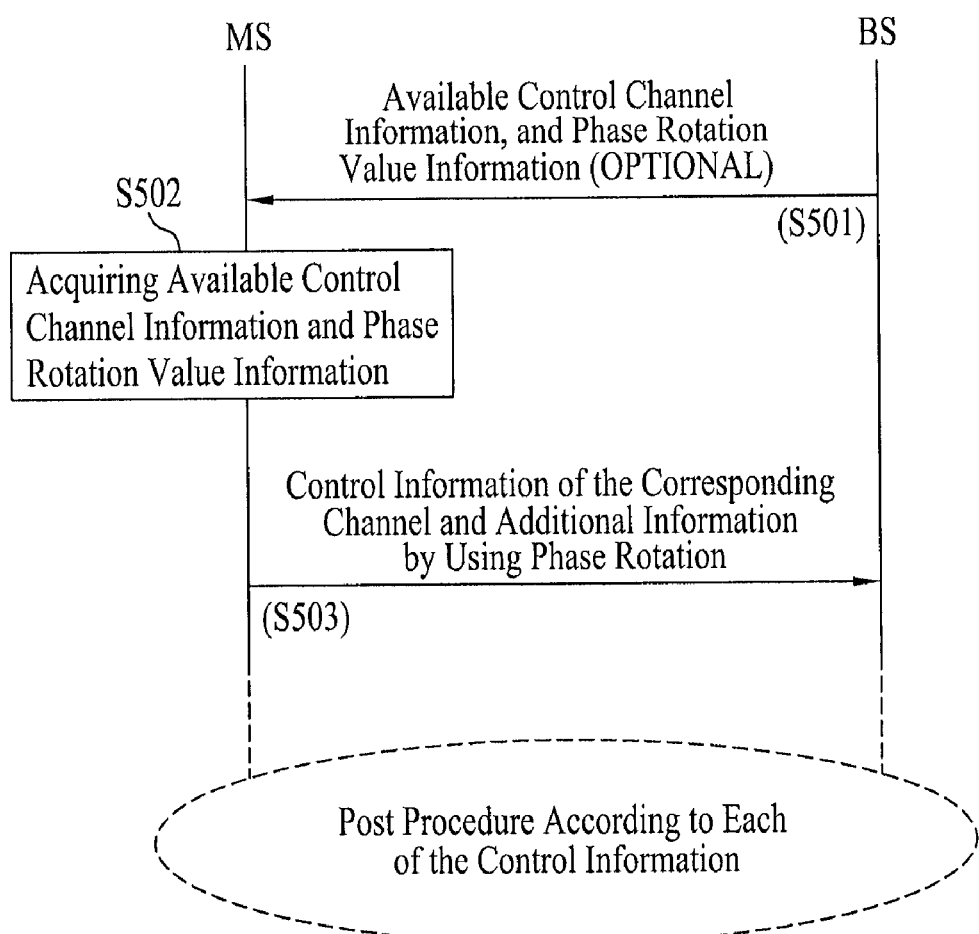
FIG. 5 is a diagram illustrating a method for transmitting and receiving control information through a specific control channel and additional information through phase rotation.

FIG. 5 is a diagram illustrating a method for transmitting and receiving control information through a specific control channel and additional information through phase rotation.

According to one embodiment of the present invention as illustrated in FIG. 5, the base station can provide the mobile station with information of a control channel, which supports a manner of transmitting additional information through phase rotation, and phase rotation value information for representing the additional information. The fast feedback channel for transmitting CQI and the ACKCH can be used as the control channel, as described above, which supports the method for transmitting additional information through phase rotation.

Furthermore, information provided through step S501 can be provided by the base station through an uplink channel descriptor (UCD) message. However, the channel information for supporting transmission of additional information through phase rotation may be provided to the mobile station by the base station through negotiation message exchange of Subscriber station Basic Capability (hereinafter, referred to as "SBC") between the base station and the mobile station, and phase rotation value information for representing additional information may previously be defined between the base station and the mobile station.

Under various cases as described above, the mobile station acquires channel information for supporting transmission of addition information, provided from the base station or through the previously determined phase rotation as described above and phase rotation value information for representing additional information in step S502.

Afterwards, the mobile station selects one control channel that can transmit additional information through phase rotation, by using the information acquired through step S502, in step S503, and transmits additional information by using phase rotation of control information of the corresponding control channel together with the control information. At this time, examples of the additional information, which is transmitted, include a bandwidth request signal and ACK/NACK signals. A plurality of kinds of control information can be transmitted as the additional information, as the case may be.

In other words, according to one embodiment of the present invention as described above, for example, the bandwidth request signal and the ACK/NACK signals can simultaneously be transmitted into the fast feedback channel for transmission of CQI through phase rotation of CQI information in addition to the CQI information. For another example, the bandwidth request signal can be transmitted through the ACKCH. In this way, various embodiments can be performed. The follow-up procedure after each step as illustrated in FIG. 5 is performed will be performed in detail in accordance with the aforementioned case. Hereinafter, each case according to the aforementioned embodiment will be described in detail.

First Embodiment

This embodiment suggests a method of requesting uplink resources together with CQI and ACK/NACK information by using a corresponding channel when the mobile station which is periodically transmitting CQI and ACK/NACK information requests the base station of uplink the resources.

Figure 6:
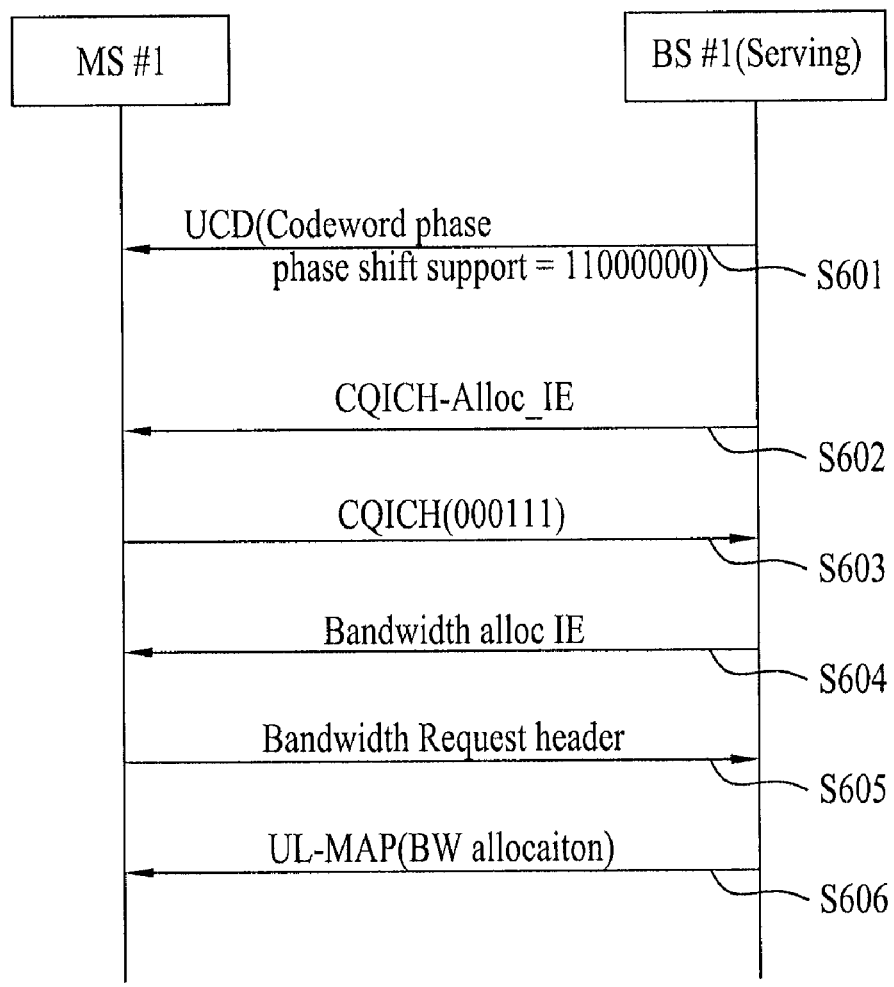
FIG. 6 is a diagram illustrating a procedure of performing a bandwidth request using CQICH in accordance with the first embodiment of the present invention.

FIG. 6 is a diagram illustrating a procedure of performing a bandwidth request using the CQICH in accordance with the first embodiment of the present invention.

First of all, in step S601, the base station can forward a channel (for example, CQICH, ACK/NACK subchannel, etc.), which supports bandwidth request in a codeword phase shift mode through the UCD message, to the mobile stations in a broadcasting type. Then, the mobile station can select the channel, which supports the above mode acquired from the UCD message, and transmit bandwidth request information to a corresponding interval. At this time, an example of bandwidth request related parameters of the codeword phase rotation mode included in the UCD message can be expressed as follows.

TABLE 3

| Title | Type (1 byte) | Length | Value |
|---|---|---|---|
| Codeword phase rotation support | 203 | 1 | In each bit position, '1' represents support of codeword phase rotation for bandwidth request. Bit #0: CQICH Bit #1: ACK/NACK channel Bit #2~7: reserved, can be set to 0. |
| Codeword phase rotation value | 204 | | Codeword phase rotation value for bandwidth request |

However, unlike the aforementioned embodiment, according to the present invention, information of the channel which supports codeword phase rotation may be provided to each mobile station by the base station in the SBC step, and a codeword phase rotation value may previously be determined between the base station and each mobile station. However, this embodiment is limited to an example that the information is provided to each mobile station by the base station through the UCD as described above.

Meanwhile, in step S602, the base station designates a slot per mobile station by using CQICH_Alloc_IE as illustrated in FIG. 1. In other words, the CQICH_Alloc_IE transmitted through step S602 may dynamically allocate the CQICH to the uplink of the mobile station or may cancel the allocated region.

If the CQICH is allocated to each mobile station as above, the mobile station can transmit signal quality information to the allocated CQICH region at a period set in the aforementioned CQICH_Alloc_IE in step S603. At this time, if the mobile station requests uplink bandwidth request to the base station, it can perform the bandwidth request by transmitting a value obtained by multiplying downlink signal quality information by the phase rotation value.

If the mobile station performs bandwidth request to the base station together with CQI in step S603, the base station can allocate uplink resources for transmitting information, which includes a length of data to be transmitted from the mobile station, to allocate the uplink resources of the mobile station based on the information received in step S603. At this time, an example of the transmitted bandwidth allocation IE can be expressed as follows.

TABLE 4

| Syntax | Size | Notes |
|---|---|---|
| Bandwidth_Allocation_IE( ){ | | |
| Duration | 6 bits | |
| UIUC | 4 bits | UIUC for transmission |
| CQICH_ID | Variable | Index for specifying CQICH resources designated in MS. A size of this field depends on a system parameter defined UCD. |
| } | | |

Although CDMA allocation IE for receiving the BR request header according to the related art includes a ranging code (8 bits), ranging symbol (8 bits), ranging subchannel (7 bits), and frame number index (4 bits) to identify the mobile station as the base station receives BR request CDMA code from the mobile station, it is noted that the bandwidth allocation IE according to this embodiment which performs bandwidth request using the CQICH can reduce a waste of radio resources as CQICH_ID (3 to 9 bits) substitutes for identification information of the mobile station as illustrated in Table 4.

As described above, the mobile station which has received the bandwidth allocation IE through step S604 can transmit the bandwidth request header in step S605. At this time, an example of the transmitted bandwidth request header can be expressed as follows.

TABLE 5

| Title | Length (bits) | Notes |
|---|---|---|
| Type | 3 | Bandwidth request and CINR report header type are defined in Table 5a of IEEE Std. 802/16e ™-2005 |
| BR | 11 | Bandwidth request: byte of uplink bandwidth requested by MS. Bandwidth request is for CQICH-ID. This request should not include any PHY overhead. This is incremental BW request. |
| CINR | 7 | — |
| DCD variable indicator | 1 | — |
| CQICH-ID | 3~9 bits | CQICH-ID represents connection which requests uplink bandwidth |
| HCS | 8 | Header check sequence (used in the same manner as HCS entrance in Table 5 of IEEE Std. 802.16e ™-2005 |

The base station which has received the bandwidth request header as above can allocate the bandwidth requested from the mobile station through step S606.

According to the first embodiment of the present invention as described above, since the mobile station transmits bandwidth request information by using the CQI channel and ACK/NACK channel, which periodically transmit data, a waste of the transmission power, delay time, and frequency resource in the mobile station can be avoided.

Second Embodiment

This embodiment is intended to suggest a method for simultaneously transmitting CQI and ACK/NACK information from a mobile station by using a CQI channel.

Figure 7:
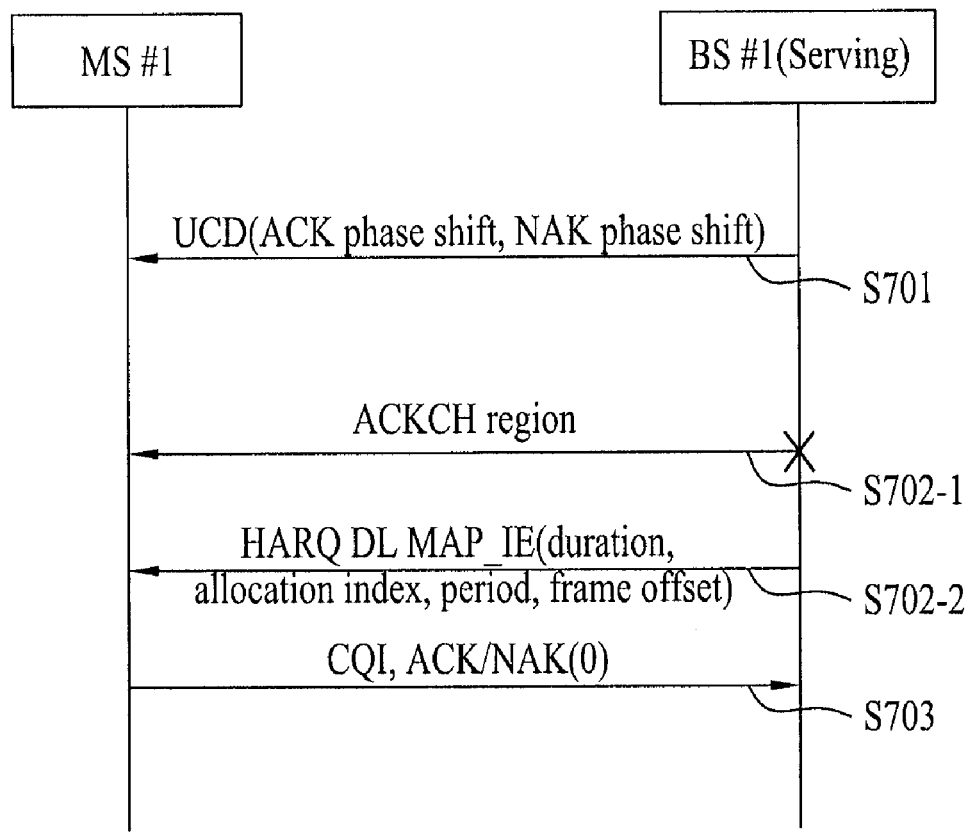
FIG. 7 is a diagram illustrating a procedure of transmitting ACK/NACK information from a mobile station using CQICH in accordance with the second embodiment of the present invention.

FIG. 7 is a diagram illustrating a procedure of transmitting ACK/NACK information from a mobile station using a CQICH in accordance with the second embodiment of the present invention.

First of all, in step S701, the base station can transmit ACK codeword phase rotation information and NACK codeword phase rotation information to the mobile stations through the UCD in a broadcast type. At this time, an example of parameters related to ACK/NACK codeword phase rotation value information included in the UCD message can be expressed as follows.

TABLE 6

| Title | Type (1 byte) | Length | Value |
|---|---|---|---|
| ACK phase rotation value | 204 | | Codeword phase rotation value for ACK |
| NACK phase rotation value | 205 | | Codeword phase rotation value for NACK |

Meanwhile, information of a transmission mode which simultaneously transmits CQI and ACK/NACK channel can be forwarded to each mobile station in the negotiation procedure of basic capability between the base station and the mobile station through the SBC-REQ/RSP procedure. In this case, an example of a type of the forwarded information can be expressed as follows.

TABLE 7

| Type (1 byte) | Length | Value | Range |
|---|---|---|---|
| 164 | 1 | Bit #0: ACKCQI channel support<br>Bit #1~7: reserved, can be set to 0. | SBC-REQ<br>SBC-RSP |

However, unlike the aforementioned embodiment, according to the present invention, information as to whether to simultaneously support ACK/NACK information and CQI information can be forwarded through the UCD message together with the aforementioned phase rotation value information. Although the phase rotation value information illustrated in Table 6 can previously be determined between the base station and the mobile station, this embodiment is limited to the example that the phase rotation value information for ACK and the phase rotation value information for NACK are forwarded through the UCD and that the information as to whether to support simultaneous transmission of ACK/NACK information and CQI information is forwarded to each mobile station in the SBC step.

Meanwhile, if the ACK/NACK information is transmitted through the CQICH in the same manner as this embodiment, HARQ DL MAP_IE for simultaneously transmitting ACK/NACK information through the CQICH can be transmitted in step S702-2 without a procedure of setting the ACHCH region in step S702-1.

In more detail, the HARQ MAP of the HARQ DL MAPIE transmitted in step S702 sequentially allocates bursts to the subchannel axis of the downlink. A start point of the burst is a position where a previous burst ends, and the burst occupies radio resources as much as a length allocated from the start point. At this time, an example of the HARQ DL MAP_IE can be expressed as follows.

TABLE 8

| Syntax | Size | Notes |
|---|---|---|
| DL HARQ Chase sub-burst IE( ){ | — | — |
| N sub burst [ISI] | 4 bits | The number of sub bursts within 2D region |
| N ACK channel | 4 bits | The number of sub bursts activated by HARQ ACK within 2D region |
| For (j=0; j<N sub burst; j++){ | — | — |
| RCID_IE( ) | variable | — |
| Duration | 10 bits | Duration of slot unit |
| Sub-Burst DIUC Indicator | 1 bit | If Sub-Burst DIUC indicator is 1, it represents that DIUC is designated in this sub-burst. Otherwise, this sub-burst uses the same DIUC as that of previous sub-burst. If j is 0, this indicator is 0. |
| Reserved | 1 bit | Set to 0 |
| If(Sub-Burst DIUC Indicator=1){ | — | — |
| DIUC | 4 bits | — |
| Repetition Coding Indication | 2 bits | 0b00 - repetition coding is not used<br>0b01 - repetition coding of 2 is used<br>0b10 - repetition coding of 4 is used<br>0b11 - repetition coding of 6 is used |
| Reserved | 2 bits | Set to 0 |
| } | — | — |
| ACID | 4 bits | — |
| AI_SN | 1 bit | — |
| ACK disable | 1 bit | In case of 'ACK Disable' =1, allocated sub-burst does not require ACK to be transmitted by SS to ACKCH region (see 8.4, 5.4, 24 of IEEE Std. 802.16e ™-2005). In this case, ACKCH is not allocated to this sub-burst in ACKCH region. BS does not perform HARQ retransmission for burst, and MS disregards ACID, AI_SN and SPID. If there exists burst, the burst is set to 0 by BS. |
| ACKCQICH enable | 1 bit | In case of 'ACKCQICH enable' =1, allocated sub-burst does not require ACKCH. CQI and ACK/NACK feedback is transmitted through CQI. |
| Dedicated DL Control Indicator | 2 bits | LSB#0 represents that it includes CQI control.<br>LSB#1 represents that it includes dedicated DL control IE. |
| If(LSB#0 of Dedicated DL Control Indicator =1){ | — | — |
| Duration(d) | 4 bits | CQI feedback is transmitted to CQI channel, which is indexed by CQI channel index, during $2^{(d-1)}$ frame by SS. If d is 0b0000, every CQI feedback deallocated when current ACID is successfully completed. If d is 0b1111, MS should report until BS commands to stop MS reporting. |

TABLE 8-continued

| Syntax | Size | Notes |
| --- | --- | --- |
| If (Duration 1=0b0000){ | — | — |
| Allocation Index | 6 bits | Index of channel within frame to which CQI report should be transmitted by SS. |
| Period (p) | 3 bits | CQI feedback is transmitted to CQI channel, which is indexed by CQI Channel Index, per $2^P$ frame by SS. |
| Frame offset | 3 bits | MS starts reporting to frame having the same 3 LSB specified by frame offset. |
| } | — | — |
| } | — | — |
| If(LSB#1 of Dedicated DL Control Indicator=1) { | — | — |
| Dedicated DL Control IE( ) | Variable | — |
| } | — | — |
| } | — | — |
| } | — | |

Referring to Table 8, if the base station requests the mobile station as to whether the transmitted data burst has been successfully received and at the same time requests CQI information (i.e., in case of ACKCQICH enable=1), the mobile station transmits the CQI information and the ACK/NACK signal using the CQICH allocated for each data burst from the HARQ MAP without allocating a separate uplink ACKCH region (i.e., ACK disable=0).

Afterwards, in step S703, the mobile station transmits the CQI information and also transmits the ACK/NACK information using phase rotation of the CQI information. Namely, the CQI information can be transmitted in such a manner that a codeword is transmitted in the same manner as the existing method, and the ACK/NACK information can be transmitted by being multiplied by the codeword based on the ACK/NACK phase rotation value received in step S701.

According to the second embodiment of the present invention as described above, the mobile station simultaneously transmits the CQI information and the ACK/NACK information using the CQI channel, so as to avoid a waste of the transmission power and radio resources.

As described above, the preferred embodiments of the present invention have been provided so that those skilled in the art can carry out the present invention. Although the preferred embodiments of the present invention have been described with reference to the first embodiment and the second embodiment, it is to be understood that various modifications can be made in the present invention by those skilled in the art without departing from the spirit and scope of the present invention set forth in the appended claims below.

For example, if control information and additional information are simultaneously transmitted to any one of control channels, which support phase rotation, by using phase rotation of corresponding control information, combination of the control channel and additional information transmitted to the control channel can be used in various manners. Also, although a transmitting side which transmits a signal to the uplink has been described as the "mobile station (MS)," the mobile station can be replaced with various terminologies such as "subscriber station," "user equipment" and "mobile terminal."

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

According to one embodiment of the present invention as described above, since additional information can be transmitted to a specific control channel using phase rotation information of corresponding control information in addition to the corresponding control information, a waste of the transmission power and uplink resources in the mobile station can be avoided.

What is claimed is:

1. A method for transmitting a control channel, the method comprising:
   acquiring information of at least one control channel and phase rotation value information, the at least one control channel supporting additional information transmission through phase rotation and the phase rotation value information representing the additional information;
   transmitting control information through one of the at least one control channel;
   transmitting the additional information through phase rotation of the control information;
   receiving a bandwidth allocation information element (IE) that includes a channel quality indicatior channel identifier (CQICH_ID);
   transmitting a bandwidth request header using the CQICH_ID; and
   receiving allocation of a bandwidth according to the bandwidth request header,
   wherein the at least one control channel includes a channel quality indicator channel (CQICH) and an acknowledgement/negative acknowledgement (ACK/NACK) channel,
   wherein the one at least one control channel is the CQICH,
   wherein the additional information is bandwidth request information, and
   wherein the phase rotation value information corresponds to the bandwidth request information.

2. The method of claim 1, further comprising acquiring the information of at least one control channel and the phase rotation value information through an uplink channel descriptor (UCD).

3. The method of claim 1, further comprising aquiring the information of the at least one control channel through a subscriber station basic capability (SBC) negotiation message and wherein the phase rotation value information is pre-defined between a transmission side and a receiving side.

4. A method for receiving a control channel, the method comprising:
   providing information of at least one control channel and phase rotation value information, the at least one control channel supporting additional information transmission through phase rotation and the phase rotation value information representing the additional information;
   receiving control information through one of the at least one control channel;
   transmitting the additional information through phase rotation of the control information;
   transmitting a bandwidth allocation information element (IE) that includes a channel quality indicator channel identifier (CQICH_ID);

receiving a bandwidth request header using the CQICH_ID; and allocating a bandwidth according to the bandwidth request header, wherein the at least one control channel includes a channel quality indicator channel (CQICH) and an acknowledgement/negative acknowledgement (ACK/NACK) channel, wherein the one of the at least one control channel is the CQICH wherein the additional information is bandwidth request information, and wherein the phase rotation value information corresponds to the bandwidth request information.

* * * * *